United States Patent
Kassebaum

Patent Number: 5,362,194
Date of Patent: Nov. 8, 1994

[54] LIFT/TILT WHEEL DOLLY

[75] Inventor: Larry A. Kassebaum, Grand Terrace, Calif.

[73] Assignee: Norco Industries, Inc., Compton, Calif.

[21] Appl. No.: 143,847

[22] Filed: Oct. 28, 1993

[51] Int. Cl.$^5$ ............................................. B60B 29/00
[52] U.S. Cl. .................................. 414/427; 280/47.28; 280/47.29; 414/428
[58] Field of Search ............... 414/426, 427, 428, 429, 414/639, 642, 648; 280/47.28, 47.29, 47.34; 254/2 R, 3 R, 3 B, 3 C

[56] References Cited

U.S. PATENT DOCUMENTS

| | | | |
|---|---|---|---|
| 3,036,723 | 5/1962 | McCormick et al. | 414/427 |
| 3,101,153 | 8/1963 | Verdery, Jr. | 254/3 C X |
| 3,749,265 | 7/1973 | Smith, Jr. | 414/427 |
| 3,951,287 | 4/1976 | Cofer | 414/428 X |
| 4,050,597 | 9/1977 | Hawkins | 414/427 |
| 5,161,931 | 11/1992 | Mayer | 414/427 |

FOREIGN PATENT DOCUMENTS 2584696 1/1987 France ............................... 414/648

OTHER PUBLICATIONS

Pg. 24 of Norco Industries' Catalog No. 6 Oct. 1, 1992.

*Primary Examiner*—Michael S. Huppert
*Assistant Examiner*—James Eller
*Attorney, Agent, or Firm*—Fulwider, Patton, Lee & Utecht

[57] ABSTRACT

A lifting and tilting device for facilitating removal, repair and re-installation of large commercial and recreational vehicle wheels comprising a frame supported by wheels, a fork supporting tines, and a hydraulic jack interposed between the frame and the fork. The fork, in addition, includes a kicker. As one actuates the jack, the fork is vertically raised from a wheel receiving position to a predetermined height. Once the fork reaches this predetermined height, the kicker, upon further actuation of the jack, operates to tilt the fork and tines upwardly and outwardly to move the wheel carried thereon into an inclined work position.

11 Claims, 3 Drawing Sheets

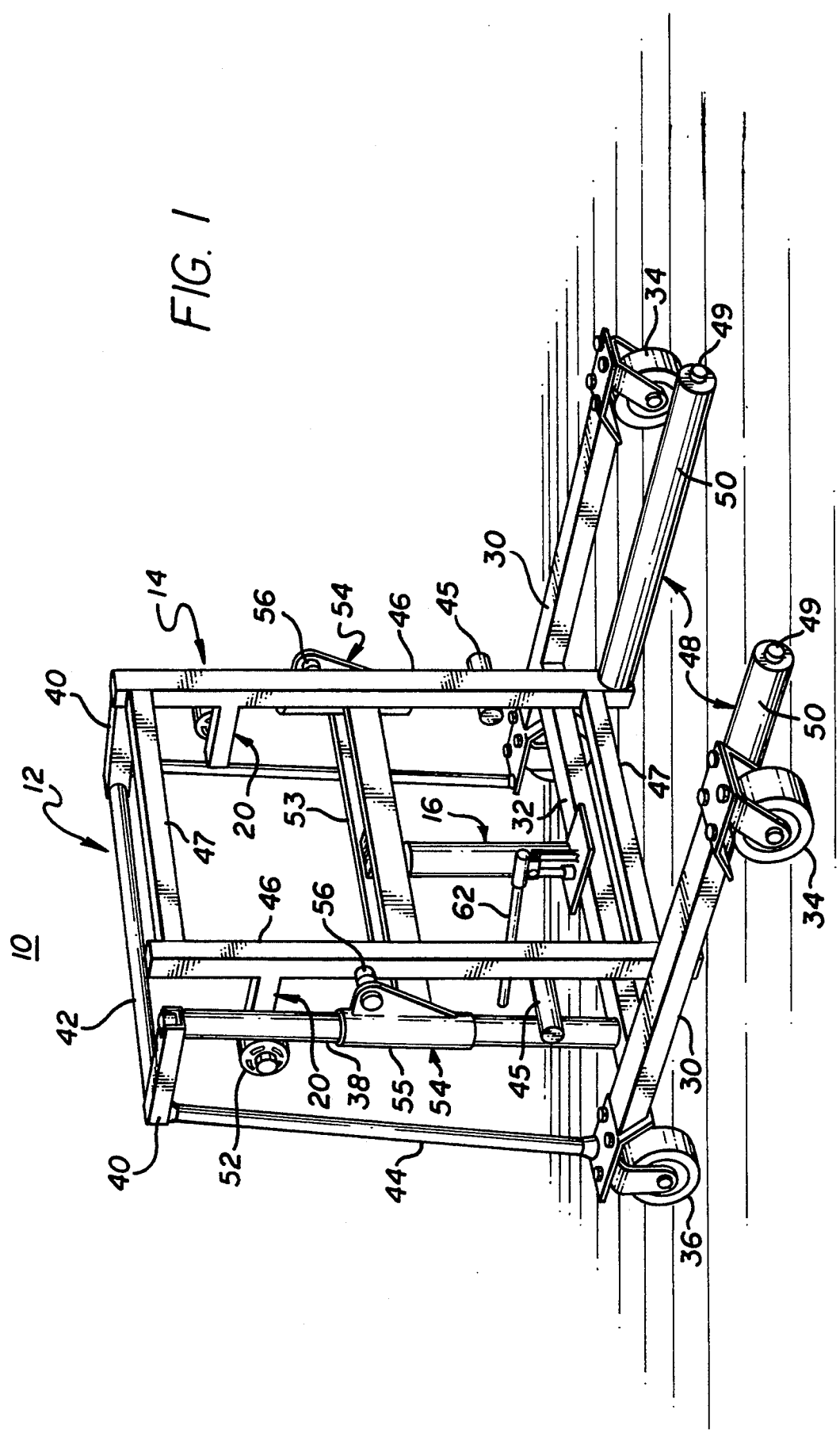

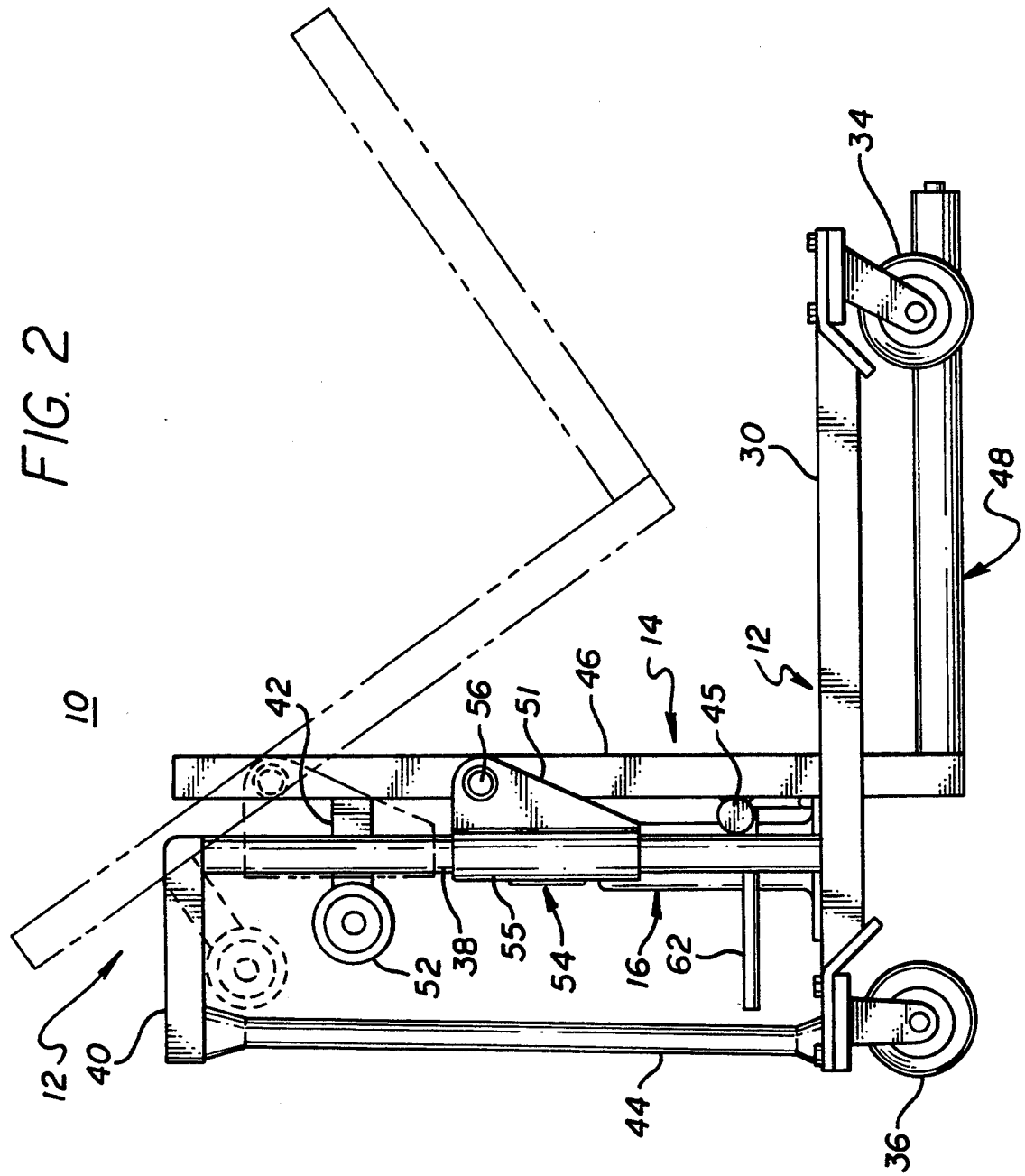

LIFT/TILT WHEEL DOLLY

BACKGROUND OF THE INVENTION

1. Field of the Invention

The present invention relates to lifting and mounting devices and, more particularly, to a maneuverable device for raising, lifting and tilting a large commercial vehicle wheel into a position for ease of repair.

2. Description of the Prior Art

It is common knowledge that, after a period of use, wheels and/or associated components of large commercial vehicles require maintenance and repair. Most commercial vehicles used for commercial trucking, transportation, and the like require large, bulky, and heavy wheels. Because of the size, weight and confined space in which a mechanic must work, handling of such wheels to maneuver into a convenient orientation is strenuous and could be dangerous to, or impose injury on, the mechanic.

Typically, when removing large vehicle wheels, a mechanic will properly jack up the vehicle and the selected wheel to be removed off the ground. The mechanic will thereafter slide a conventional wheel dolly under the wheel. Conventional wheel dollies typically carry a wheel cradle which can be vertically raised to engage and support the wheel during its removal. After the wheel has been removed from the vehicle, the dolly carrying the wheel may be rolled away to position the wheel for access to the components thereof by the mechanic.

Conventional wheel dollies are typically restricted to only vertical lifting capability to assist the mechanic in positioning the wheel or wheel components for repair. A dolly having only vertical lifting capability requires a mechanic, in many instances, to crouch or bend over to have access to the wheel components during repair and maintenance. This frequently requires the mechanic to then remain for long periods of time in a contorted stooped or bent position while working which contributes to fatigue and frequent injury stemming from exerting force from an anatomical awkward position. Therefore, it is desirable to have a wheel dolly including an additional feature to rearwardly tilt the wheel back into an inclined position to give improved accessibility to the wheel and its components while alleviating the necessity for a mechanic to work in contorted or uncomfortable positions.

Therefore, it is the object of the invention to provide a wheel dolly capable of lifting a wheel to support it during removal and thereafter tilting such wheel and its associated components in a rearward inclined position to provide better access and improved workability on such wheel.

SUMMARY OF THE INVENTION

In accordance with the invention, a tilt wheel dolly facilitates removal and installation of large commercial vehicle wheels having vertical lifting capacity and including an adjustable tilting feature to facilitate desired orientation of the wheel once removed from the vehicle for maintenance and repair. The dolly includes a frame supported by wheels, a fork supporting tines, and a hydraulic jack interposed between the frame and the fork. The fork also includes a kicker whereupon raising the fork from a receiving position to a work position, the kicker operates to tilt the fork and the tines upwardly and outwardly to an inclined position.

On one embodiment, as one actuates the jack, the fork rises vertically to a predetermined height. Once the fork reaches this predetermined height, rollers carried on kicker arms engage rails on the frame, whereupon further advancement by the jack causes the rollers to travel rearwardly along the rails and pivot the fork relative to the frame about the pivot sleeves, whereby the fork, tines and the vehicle wheel carried thereon are moved into the inclined working position.

Other features and advantages of the invention will become apparent from the following detailed description taken in conjunction with the accompanying drawings, which illustrate, by way of example, the features of the invention.

BRIEF DESCRIPTION OF THE DRAWINGS

FIG. 1 is a perspective view of a lift/tilt device of the present invention illustrating the fork thereof in a lowered workpiece receiving position;

FIG. 2 is a side view of the lift/tilt device of FIG. 1 and illustrating, in phantom, the fork thereof in a raised inclined work position;

DETAILED DESCRIPTION OF THE PREFERRED EMBODIMENT

Figure 4:
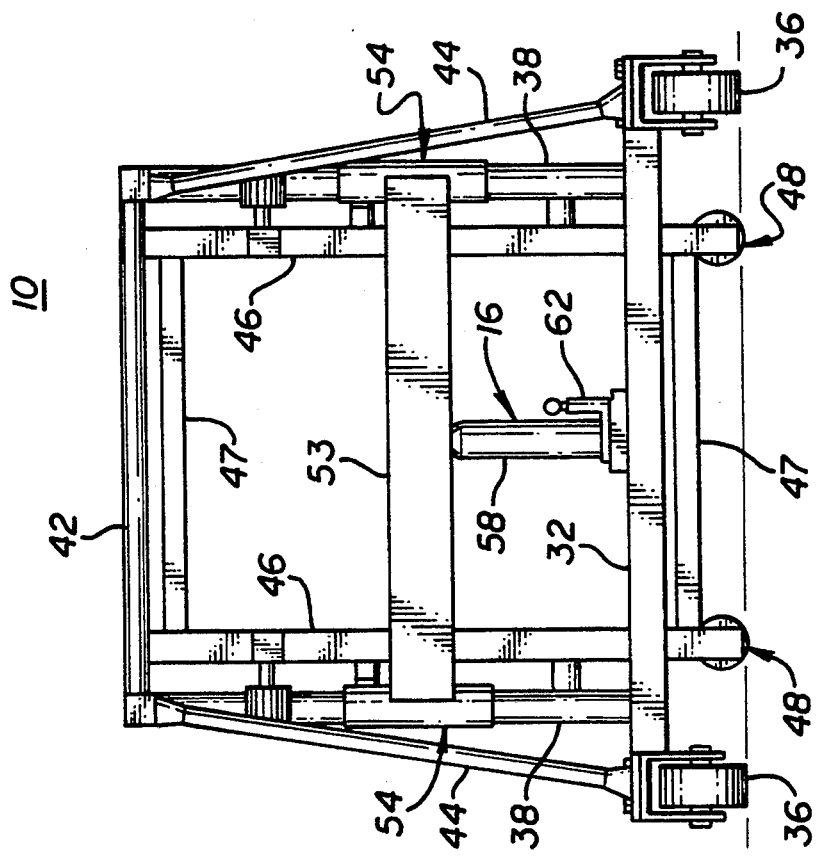
FIG. 4 is a rear view of the lift/tilt device illustrating the fork thereof in a lowered workpiece receiving position as shown in FIG. 1.
Figure 3:
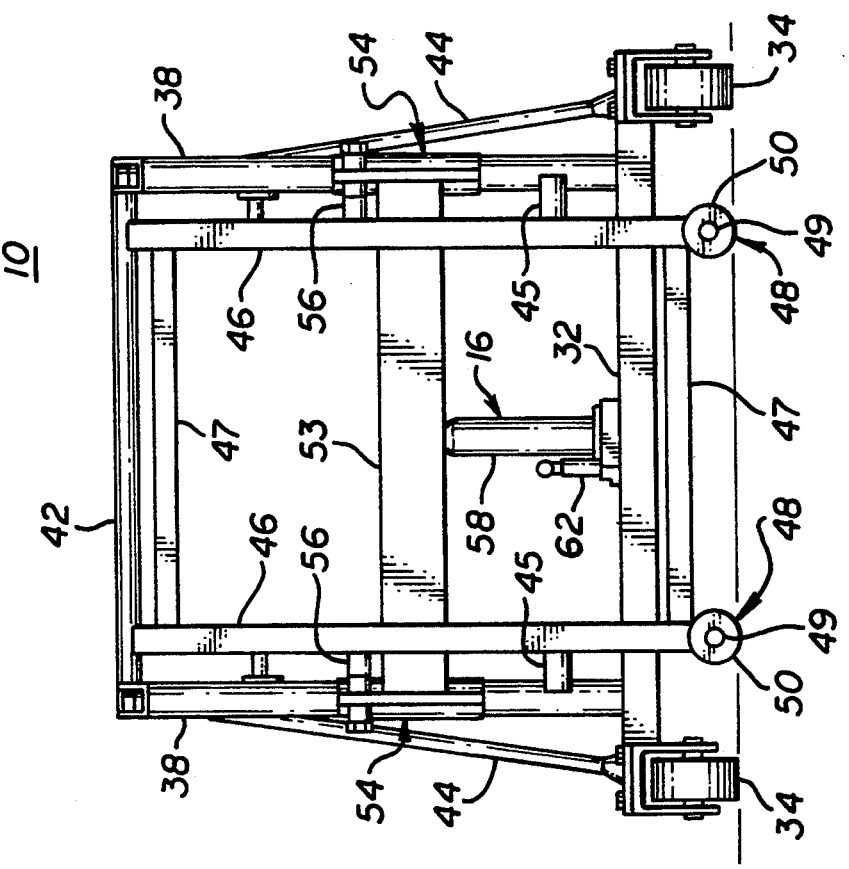
FIG. 3 is a front view of the lift/tilt device illustrating the fork thereof in a lowered workpiece receiving position as shown in FIG. 1.

Referring to the drawings for purpose of illustration, with particular reference to FIGS. 1, 3 and 4, a mobile tilt dolly of the present invention is generally shown at 10 for use in removing a wheel assembly from large commercial vehicles such as tractor-trailers, buses, large recreational vehicles, and the like. The tilt dolly supports the wheel during removal from the vehicle and thereafter, once the wheel has been disengaged from the vehicle, is utilized to carry the wheel thereon.

The dolly is further operative to raise and tilt the vehicle wheel assembly to an inclined orientation for ease of repair and maintenance. The lift dolly includes, generally, an L-shaped main frame 12 pivotally and slidably carrying an L-shaped fork 14 and a jack 16 being interposed between such fork and frame. The fork carries a kicker arm, generally designated 20, which, upon raising of the fork from a lowered receiving position to a predetermined height relative to the frame, engages the main frame so upon further elevation of the fork operatively tilts the fork, and the vehicle wheel carried thereon, upwardly and outwardly to an inclined work position. The device is sized to be used with single, tandem, or duplex tire and wheel assemblies.

Due to the size, weight, and configuration of large wheels utilized with large commercial vehicles, wheel dollies are necessary to assist in supporting such wheels and their associated components during removal for repair and subsequent re-installation. Conventional wheel dollies currently in use typically incorporate a forklift cradle having tines. After a vehicle has been properly jacked up to raise the wheel off the ground, the tines of the conventional dolly are manipulated about the wheel and vertically raised to support the wheel during its removal. Once the wheel is disengaged from the vehicle, the conventional dolly is employed to carry the wheel away from the vehicle so that the mechanic can perform repairs to the wheel or its components. It has been common practice to manufacture these conventional wheel dollies with only vertical lifting capability, with the cradle having only limited vertical rise. Conventional wheel dollies of this nature require the mechanic to, in many instances, bend over, crouch, or position himself in an otherwise awkward position when repairing the wheel or its component. In such positions the mechanic is particularly prone to fatigue and injury.

The frame 12 is formed with a transverse cross bar 32 and a pair of forwardly projecting laterally spaced apart feet 30 rigidly secured in parallel alignment. The frame is mobile and, to this end, the front and rear ends of the feet are carried by heavy duty floor engaging casters 34 and 36, respectively. The front casters 34 are of the swivel type and the rear casters 36 are fixed in longitudinal alignment with the feet. The casters 34 and 36 are provided with braking mechanisms to lock the device against unwanted rolling. Preferably, the frame is of hollow rectangular tubular construction to be bolted together.

The vertical back of the main frame is of rectangular construction defined by a pair of vertically elongated cylindrical frame posts 38 rigidly attached, preferably by welding, on the opposite ends of the cross bar 32. At the top end of the posts, a pair of rearwardly extending rails 40 are mounted. At the rear end of the rails is a bar transversely disposed therebetween to function as a hand grasp 42. A pair of generally vertical support rods 44 are mounted between the rear end of the rails and the rear end of the feet 30 to increase the rigidity of the frame structure and resist bending moment of the posts about the cross bar. Preferably, the vertical frame posts 38 are constructed of tubular hollow steel.

The back of the fork 14 is of open frame vertical construction formed with a pair of longitudinally spaced apart vertical fork posts 46 and a pair of horizontal top and bottom fork frame members 47 transversing the fork posts at their opposite ends thereof. The fork posts, at the bottom end thereof, mount forwardly projecting tines, generally designated 48, laterally spaced apart from one another for nesting therebetween the bottom section of a vehicle wheel. When the fork is in a lowered receiving position, tines 48 are spaced apart laterally a distance to be received between the forwardly projecting feet 30 and to be in a recessed position below the elevation of the top surface of such feet. The tines include respective rods 49 welded on their back ends to the respective bottom ends of the fork posts 46 and having telescoped thereover respective elongated thick walled tubes 50. Bearings are preferably interposed between the tubes 50 and the rods 49 to perform like heavy duty conveyor rollers to allow wheels supported thereon to be easily rotated during repair and inspection. In addition, the tines are sufficiently elongated to support tandem and duplex wheels.

The kicker arms 20 are fixedly attached to the top of each of the vertical fork posts 46 and project rearwardly to carry respective follower rollers 52 at the rear ends thereof.

The respective vertical frame posts 38 telescopically mount lifter sleeves 54, each comprising an open hollow cylindrical tube 55 and a forwardly extending triangular connecting plate 51, engaged at its front extremity a hinge pin 56 projecting outwardly from the adjacent fork posts 46. Mounted low on the fork posts 46 are respective laterally projecting stop bars 45 which are positioned to engage the front surfaces of the respective vertical frame posts 38 to limit downward and rearward rotation of such fork to hold the tines 48 in a horizontal position as shown in FIG. 1.

A transverse lift bar 53 spans the distance between the cylindrical tubes 55 of the lifter sleeves 54 and is affixed on its opposite lateral ends to such tubes. The hydraulic jack 16 is interposed and affixed between the cross bar 32 of the frame 12 and the fork lift bar 53.

The inside diameters of the respective cylindrical tubes 55 are slightly greater in diameter than the outside diameter of the vertical frame posts 38 to guide vertical travel of such sleeves without undesired slop. The vertical frame posts 38 may be suitably lubricated with a heavy duty grease to provide smooth slidable interaction between the frame posts and the lifter sleeves 54.

In the assembled configuration, the vertical fork posts 46 are disposed laterally inwardly of the vertical frame posts 38 and the respective kicker arms 20 pass rearwardly on the lateral interior sides of the vertical frame posts 38 to mount the kicker rollers 52 on the lateral exterior surface thereof in alignment below the respective kicker rails 40. The jack 16 is of the conventional manually operated type and comprises a lower cylinder 58 and an upper piston rod (not shown) extensibly mounted to and within the jack cylinder. The cylinder 58 is securely connected, preferably by welding to the transverse bottom crossbar 32. The upper end of the piston rod is rigidly connected, as by welding, to the lift bar 53 transversed between the two pivot sleeves 54. The jack 16 further includes an actuating handle 62 for oscillation to pump the piston rod to its extended position with respect to the cylinder 58. A valve handle (not shown) is included for releasing hydraulic pressure on the piston rod to return the piston rod from its extended position to its lowered position. Preferably, a three-ton jack is employed in connection with the invention. Because of the orientation of the jack and the frame and fork, a certain amount of mechanical disadvantage is encountered. Thus, the device has been designed with a one-half ton capacity for safely lifting and tilting the wheel assemblies carried thereon. However, it should be noted that the device may be designed to have greater or lesser lifting/tilting capability if so desired.

As shown in FIG. 2, to move the fork 14 to the lowered receiving position, the jack 16 is retracted to lower the tines 48 of the fork 14 below the level of the top of the longitudinal frame feet 30. It will be appreciated that, as the jack 16 is retracted, the weight of the forwardly projecting tines 48 urge the fork to rotate clockwise about the pivot pins 56 to the degree allowed by the stop bars 45 engaging the respective vertical frame posts 38 holding the tines 48 in their horizontal positions as shown in FIG. 1. In this position the tines may be moved into spanning position on the opposite side of a bottom section of a mounted vehicle wheel and the lug bolts removed to free the wheel for lifting by the fork. The operator may actuate the handle 62 to drive the jack piston vertically upwardly thereby carrying the lift bar 52, pivot sleeves 54 and, consequently, the fork attached thereto vertically in guided relationship along the vertical frame posts 38 of the frame. In addition, the kicker rollers 52 vertically follow the vertical frame posts. Raising of the tines 48 will engage such tines with the vehicle wheel so that further actuation of the jack will elevate the wheel so it may be freed from the vehicle so that the operator may grasp the handle bar 42 and draw the dolly carrying the disengaged wheel away from the vehicle. Further actuation of the jack will drive the fork further upwardly on the vertical frame posts 38 causing the kicker rollers 52 to follow the back surface of such frame posts until they contact the bottom side of the kicker rails 40. Upon further actuation of the jack, the fork will be elevated further causing the kicker rollers 52 to engage the bottom of the kicker rails 40 blocking further vertical travel thus causing further actuation of such jack to drive the lift bar 50 further upwardly relative to the rails 40 thus causing the fork to rotate counter clockwise about the pivots 56 thereby kicking the bottom of such fork outwardly and upwardly in the forward direction to position vehicle wheels at about a 45° angle to the horizontal.

In operation, the mechanic will grasp the handle bar 42, to maneuver the dolly 10 to a wheel selected to be removed from the vehicle. The vehicle and selected wheel will properly be jacked off the ground whereby the wheel is approximately one to four inches above the ground. With the fork 14 in its lowered receiving position, the dolly will be wheeled laterally inwardly toward the selected wheel. The mechanic will loosen the lugs or studs affixing the wheel to the truck and thereafter maneuver the dolly into operable position whereby the vehicle's wheel is interposed between the tines 48. The mechanic may then actuate the jack 16 to vertically raise the fork relative to the frame 12 whereby the tines engage the wheel, relieving the weight of the wheel from the vehicle's axle hub. The mechanic may now fully remove the lug nuts or studs from the wheel to disengage the wheel from the truck. The mechanic may now pull the dolly with the supported wheel from the vehicle. Once the wheel and device have been moved clear of the vehicle, the mechanic may lock the casters, 34 and 36, to prevent the device and wheel carried thereon from movement. The mechanic may then further raise the fork relative to the frame to the point where the kicker rollers 52 engage the bottom surface of the respective kicker rails 40. Further advancement of the jack causes the rollers to travel rearwardly along the rails whereby the fork 14 pivots about the hinge pins 56. This further advancement results in the fork and the tines being kicked outwardly and upwardly to the inclined position, shown in broken lines in FIG. 2, carrying the wheel into a working position. In this working position, the mechanic has easy convenient access to the wheel for performing repairs and maintenance without having to kneel, crouch or assume unduly awkward positions. Because the tine tubes 50 provide free rotation about the tine rods 49, the mechanic may rotate the wheel on such tine tubes to any desired rotary orientation.

From the foregoing it will be appreciated that the tilt/lift dolly of the present invention provides a sturdy, maneuverable, and uncomplicated device for assisting a mechanic in removing relatively large heavy commercial vehicle wheels from such vehicles and having a feature to tilt the wheel in an inclined angle for easy convenient access to such wheels or wheel components in need of repair or maintenance.

While the particular form of the invention has been illustrated and described, it will be apparent that various modifications can be made without departing from the spirit and scope of the invention.

What is claimed is:

1. A wheel dolly for manipulating a heavy wheel and comprising:

a dolly frame including a kicker rail;
wheels supporting said dolly frame;
a fork carried movably from said frame for vertical rectilinear travel relative to said frame and including horizontally projecting laterally spaced apart wheel support tines;
a kicker carried from said fork and operative upon raising of said fork from a lowered wheel receiving position to a predetermined kicker height to engage said rail and, upon further raising of said fork above said predetermined kicker height, to shift said fork forwardly to an outwardly and upwardly inclined work position;
a jack interposed between said frame and said fork to raise said fork relative to said frame
said dolly frame including at least one vertical post and a sleeve received telescopically over said post for vertical travel thereon; and
said dolly including pivot means mounting said fork from said post, for and when said kicker is operative upon raising of said fork above said predetermined kicker height, to rotate said fork about said pivot means from said receiving position to said work position.

2. The wheel dolly according to claim 1 wherein:
said frame is formed at its lower end with forwardly projecting laterally spaced apart wheel support feet and a pair of rearwardly disposed vertical laterally spaced apart frame posts.

3. The wheel dolly according to claim 1 wherein:
said fork includes a vertical frame segment; and
said kicker includes a horizontally extending kicker arm carried from said vertical frame segment and a follower for, when said fork is raised to said predetermined kicker height, engaging said follower with said kicker rail and further operative upon further elevation of said fork, to be restrained by said rail and to kick said tines forwardly and upwardly to said work position.

4. The wheel dolly according to claim 1 wherein:
said kicker includes a kicker arm projecting rearwardly from said fork and includes, on its rear extremity, a follower, said kicker rail projecting horizontally from said dolly frame and into the path of said follower to be, when said fork is raised to said predetermined kicker height, engaged by said follower, said kicker arm and fork being so configured and arranged that further lifting of said fork upwardly beyond said predetermined kicker height operates to kick said tines to said work position.

5. The wheel dolly according to claim 4 wherein:
said follower is in the form of a roller.

6. The wheel dolly according to claim 1 wherein:
said frame is formed with forwardly projecting, laterally spaced apart feet mounted on said wheels; and
said tines are spaced laterally apart a distance to be, when said fork is in said lowered wheel receiving position, received between said feet.

7. The wheel dolly according to claim 1 wherein:
said fork includes stops for, when said fork is pivoted to said wheel receiving position, engaging said dolly frame to support said fork from rotation about said pivot means to lower the free ends of said tines below a horizontal plane.

8. The wheel dolly according to claim 1 wherein: said frame includes a handle bar.

9. The wheel dolly according to claim 1 wherein:

said tines include respective rollers freely rotatable about their respective longitudinal axes.

10. The wheel dolly according to claim 1 wherein:

said vertical post comprises a pair of laterally spaced apart vertical posts disposed in a vertical plane and said sleeve comprises a pair of slider sleeves telescoped onto said posts;

said kicker includes a pair of kicker rails disposed above the elevation of said sleeves and projecting rearwardly of said vertical plane and include at the rear ends respective followers to engage the respective rails, and said pivot means pivotally carrying said fork from the respective said sleeves; and said jack is disposed in said vertical plane so that when said jack drives said fork upwardly causing said follower to engage the respective said kicker rails, upon further lifting of said fork by said jack, said pivot means will be carried upwardly relative to said follower to cause said fork to be rotated about said pivot means to pivot said tines outwardly into said work position.

11. A wheel dolly for raising a heavy wheel to an inclined work position:

a dolly frame including forwardly projecting, laterally spaced apart feet carried on wheels;

fork frame for vertical movement relative to said dolly frame from a lowered position to an elevated position and including a pair of laterally spaced apart tines for spanning the bottom section of a tire mounted on a wheel to be manipulated into said work position, said fork frame being further manipulated to said inclined position urging said tines forwardly and upwardly;

a kicker operative to shift said fork frame to said work position;

a drive interposed between said dolly frame and said fork frame, said drive being operable to raise said fork frame from said lowered position to said elevated position and to operate said kicker to manipulate said fork frame to said inclined work position said dolly frame including at least one vertical post and a sleeve received telescopically over said post for vertical travel thereon; and said dolly including pivot means mounting said fork from said post, for and when said kicker is operative upon raising of said fork above a predetermined kicker height, to rotate said fork about said pivot means from said lowered position to said work position.

* * * * *